(12) United States Patent
Caillon

(10) Patent No.: US 8,224,479 B2
(45) Date of Patent: Jul. 17, 2012

(54) METHOD OF SORTING MAILPIECES, THE METHOD INCLUDING OPTIMIZED MANAGEMENT OF MAILPIECE SIGNATURE EXPLORATION SPACE

(75) Inventor: Christophe Caillon, Bretigny sur Orge (FR)

(73) Assignee: Solystic, Gentilly Cedex (FR)

( * ) Notice: Subject to any disclaimer, the term of this patent is extended or adjusted under 35 U.S.C. 154(b) by 606 days.

(21) Appl. No.: 12/447,074

(22) PCT Filed: Feb. 9, 2009

(86) PCT No.: PCT/FR2009/050205
§ 371 (c)(1),
(2), (4) Date: Apr. 24, 2009

(87) PCT Pub. No.: WO2009/106778
PCT Pub. Date: Sep. 3, 2009

(65) Prior Publication Data
US 2011/0054667 A1    Mar. 3, 2011

(30) Foreign Application Priority Data
Feb. 26, 2008 (FR) .................... 08 51204

(51) Int. Cl.
*G06F 7/00* (2006.01)
*G06F 19/00* (2006.01)
*G06Q 30/00* (2006.01)
*G06K 9/00* (2006.01)

(52) U.S. Cl. ........ 700/223; 700/224; 700/225; 700/226; 700/214; 700/115; 705/330; 209/584

(58) Field of Classification Search .................. None
See application file for complete search history.

(56) References Cited

U.S. PATENT DOCUMENTS

| 6,888,084 B1 * | 5/2005 | Bayer ........................... 209/584 |
| 7,674,995 B2 * | 3/2010 | Desprez et al. ............... 209/584 |
| 7,933,844 B2 * | 4/2011 | Rundle ......................... 705/330 |
| 2008/0158615 A1 * | 7/2008 | Parkos et al. ................. 358/402 |

FOREIGN PATENT DOCUMENTS

| EP | 1 222 037 A | 7/2002 |
| FR | 2 866 252 A1 | 8/2005 |
| FR | 2 881 663 A1 | 8/2006 |
| WO | WO 2008/053024 A1 | 5/2008 |

* cited by examiner

*Primary Examiner* — Gene Crawford
*Assistant Examiner* — Yolanda Jones
(74) *Attorney, Agent, or Firm* — Rothwell, Figg, Ernst & Manbeck, P.C.

(57) ABSTRACT

In a method of sorting mailpieces in a plurality of sorting passes in a sorting machine having accumulation sorting outlets, use is made of a technique for identifying the mailpieces by image signatures derived from the images of the mailpieces. The mailpieces are transferred in trays between two sorting passes. A match between a current fingerprint in the second sorting pass and fingerprints generated in the first sorting pass is searched for in an exploration memory space containing a limited number of fingerprints. The size of this exploration space is optimized by associating the signatures and the trays with designation data indicative of sorting outlets, and with time data delivered by a clock.

5 Claims, 3 Drawing Sheets

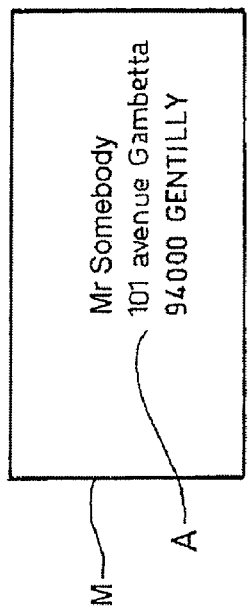
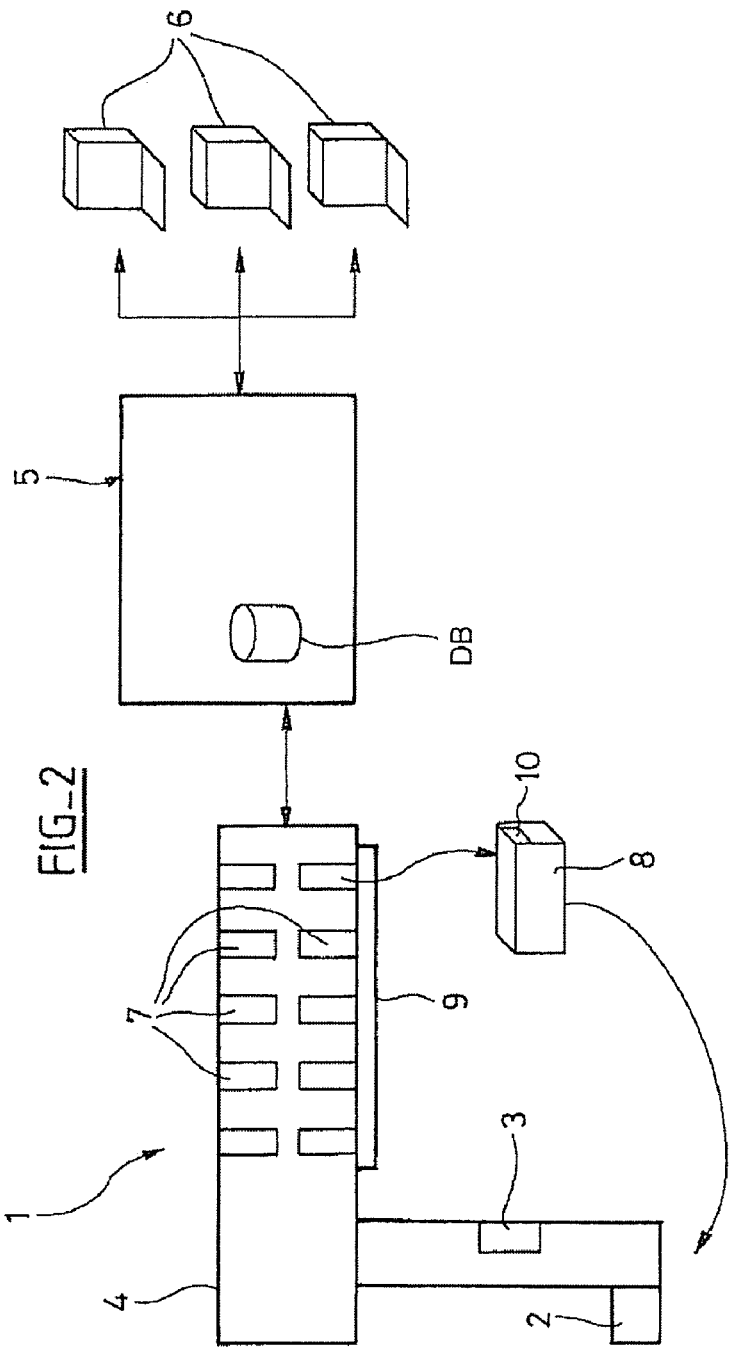

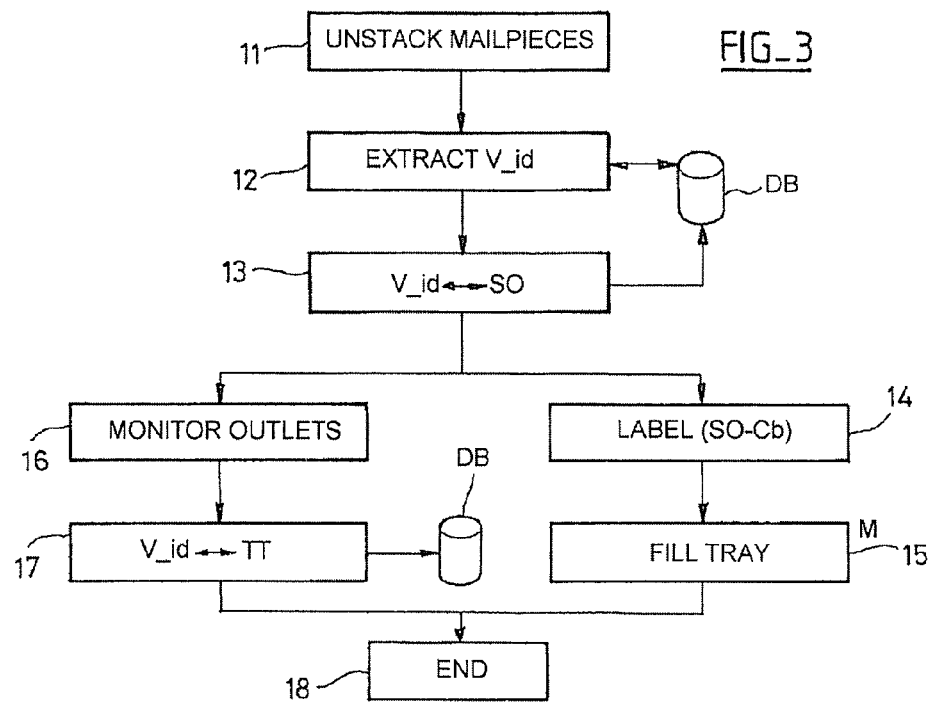
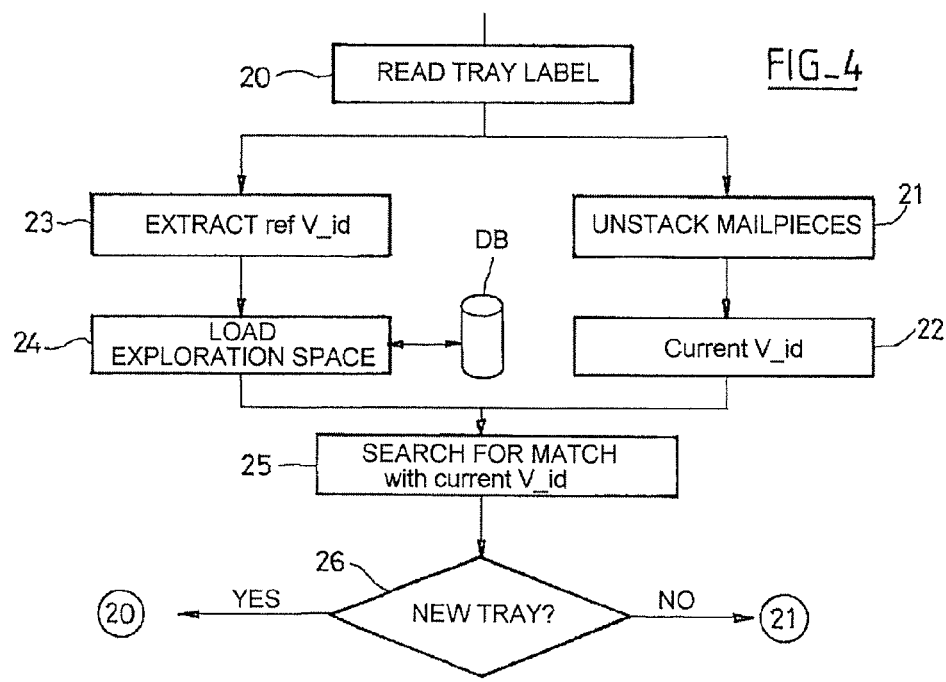

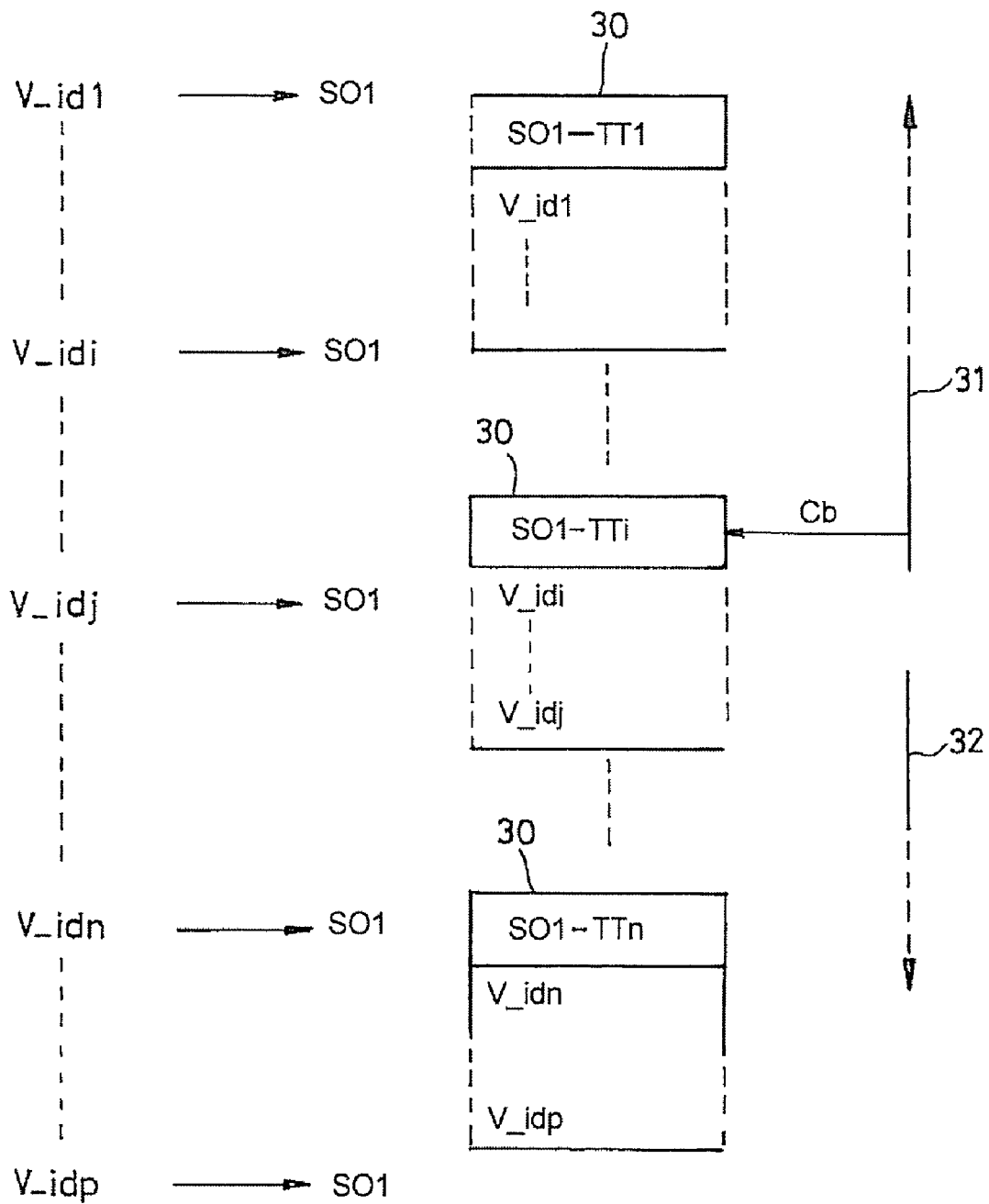
FIG_5

METHOD OF SORTING MAILPIECES, THE METHOD INCLUDING OPTIMIZED MANAGEMENT OF MAILPIECE SIGNATURE EXPLORATION SPACE

CROSS-REFERENCE TO RELATED APPLICATIONS

This application is a 35 U.S.C. 371 National Phase Application from PCT/FR2009/050205, filed Feb. 9, 2009, and designating the United States, which claims the benefit of France Patent Application No. 0851204, filed Feb. 26, 2008.

BACKGROUND OF THE INVENTION

1. Field of the Invention

The invention relates to a method of sorting mailpieces in at least two sorting passes in a sorting machine with sorting outlets into which the mailpieces are directed from an unstacking inlet, wherein, in the first sorting pass, images are formed of the surfaces of the mailpieces so as to derive first image signatures serving as unique identifiers for the mailpieces in the machine, wherein, in the second sorting pass for sorting the mailpieces, an image of the surface of a current mailpiece is formed again so as to derive a current image signature associated with the current mailpiece, and first image signatures grouped together in a set in an exploration memory space are scanned in order to detect a match with said current signature, and wherein the mailpieces are transferred manually using storage trays from the sorting outlets to the unstacking inlet between the two sorting passes.

2. Discussion of the Background Art

The process for generating such image signatures or digital "fingerprints" for the mailpieces and how to compare two image signatures for detecting a match is described in Patent Document EP 1 519 796. FIG. 1 shows a face of a mailpiece M that bears a delivery address A. The image signature serving as a unique identifier for the mailpiece in accordance with the method of the invention is derived from the image of the surface of the mailpiece that bears the delivery address A and said image signature typically comprises an image component representative of the graphical characteristics of the image (e.g. histograms of the shades of gray in various distinct portions of a plurality of grids applied over the image) and a postal component representative of the characteristics of the delivery address A (number of signs in the address, position of the address block in the image, etc). In principle, these two components should not be correlated to each other in order to guarantee that the identifier is totally unique.

FIG. 2 is a highly diagrammatic view of a sorting machine 1 having an inlet unstacker 2 for inserting mailpieces into the machine, a device 3 for forming images of the surfaces of the mailpieces, and a conveyor 4 that directs the mailpieces in series towards the sorting outlets 7. The sorting machine 1 is monitored and controlled by a data processing unit 5 having a memory DB. The unit 5 can be connected in a manner known per se to video coding units 6.

A storage tray 8 is also shown, by means of which an operator transfers the mailpieces from the sorting outlets to the inlet of the machine between two sorting passes (arrow between the outlets 7 and the tray 8, and arrow between the tray 8 and the unstacker 2). It should be understood that a plurality of trays such as 8 are used to transfer the mailpieces between all of the outlets 7 and the inlet 2 of the machine. Reference 9 in FIG. 2 designates a set of labeling machines that act on command to deliver coded labels 10 to be affixed to the trays such as 8. A scanner (not shown) is provided at the inlet of the machine so as to read back the labels on the trays and so as to have them identified by the unit 5.

Conventionally, during a first sorting pass, mailpieces such as M are thus inserted manually by the operator into the inlet unstacker 2 of the sorting machine 1. The mailpieces are unstacked so as to be put in series and conveyed on edge past the device 3 so as to form a digital image of the surface of each mailpiece. An image signature is derived from the image of the surface of each mailpiece by the unit 5 and is put into correspondence in the memory DB with sorting data read from the image by Optical Character Recognition (OCR) and/or by video-coding.

The mailpieces directed into the sorting outlets are then transferred using trays 8 to the inlet of the sorting machine for a new sorting pass. Where appropriate, the second sorting pass could be performed on another sorting machine.

For the second sorting pass, the mailpieces are emptied manually from the storage trays 8 by the operator and they are placed in the magazine of the inlet unstacker 2 so that, once again, they are put into series and are conveyed past the device 3 where an image of the surface of each current mailpiece bearing the address A is formed again, and a current image signature is computed again for each current mailpiece by the unit 5. On the basis of a current signature, the unit 5 scans, in the memory, the signatures computed during the first sorting pass, so as to detect a match between one of said signatures and the current signature, with a view to retrieving sorting data from the memory DB.

Document EP 1 222 037 describes a method of limiting the amount of signature exploration space that is to be scanned in a memory, that method relying on strict compliance with the chronological order for the mailpieces in the trays and then in the magazine of the inlet unstacker.

However, with sorting outlets of the accumulation type in which the mailpieces are stacked by means of a stacker, chronological order need not necessarily be preserved, e.g. if the mailpieces are mishandled while they are being stored in or emptied from a tray.

That known method of optimizing the size of memory space for image signature exploration is therefore not suitable for a sorting machine with accumulation sorting outlets, i.e. with outlets having stackers. Unfortunately, that type of sorting outlet is in wide use for sorting mail of C5 format in compliance with Standard ISO-269.

SUMMARY OF THE INVENTION

An object of the present invention is thus to propose a method of sorting mailpieces in a sorting machine, in particular in a sorting machine having accumulation sorting outlets, which method uses identification of the mailpieces in a memory by image signatures, and in which method the size of the memory space for signature exploration in the second sorting pass is optimized, including when the chronological order of the mailpieces is not preserved between the first sorting pass and the second sorting pass.

Another object of the present invention is to propose such a method that is capable of operating in a sorting environment involving multiple machines and/or multiple sites in which operating constraints mean that it is not always possible to keep a uniform flow of mail between two sorting passes due to the numerous handling operations performed by the operators on the mail.

To these ends, the invention provides a method of sorting mailpieces in at least two sorting passes in a sorting machine with sorting outlets into which the mailpieces are directed from an unstacking inlet, wherein, in the first sorting pass, images are formed of the surfaces of the mailpieces so as to derive first image signatures serving as unique identifiers for the mailpieces in the machine, wherein, in the second sorting pass for sorting the mailpieces, an image of the surface of a current mailpiece is formed again so as to derive a current image signature associated with the current mailpiece, and first image signatures grouped together in a set in an exploration memory space are scanned in order to detect a match with said current signature, and wherein the mailpieces are transferred manually using storage trays from the sorting outlets to the unstacking inlet between the two sorting passes, said method being characterized in that it further comprises the following steps:

during the first sorting pass: recording first data in a machine memory in correspondence with each first signature associated with a mailpiece, said first data being designation data indicative of the sorting outlet number to which the mailpiece is directed; recording second data in the memory in correspondence with the first signature associated with said mailpiece, the second data being time data as delivered by a clock; and affixing a label on each storage tray in which the mailpieces taken from a sorting outlet are transferred, the label coding third data and fourth data, said third data being designation data indicative of said sorting outlet number, and said fourth data being time data delivered by said clock; and during the second sorting pass, when a current storage tray filled with mailpieces is presented at the unstacking inlet: retrieving said third and fourth data from the label affixed on the current tray; identifying a reference signature from among said first signatures recorded in the memory, said reference signature having first and second data that correspond respectively to said third and fourth data retrieved from the label on the current tray; and loading into the exploration memory space first signatures that are chronologically contiguous with said reference signature and having the same designation first data, the number of chronologically contiguous first signatures in the exploration memory space being determined on the basis of the maximum mailpiece storage capacities of a tray and of a sorting outlet.

The method of the invention can present the following features:

the number of mailpieces directed to each sorting outlet in the first sorting pass is counted, the time second data is generated when it is detected that a sorting outlet has accumulated a predetermined number of mailpieces, and said time second data is assigned to the signatures of those mailpieces;

the accumulation activity of each sorting outlet in the first sorting pass is monitored, the time second data is generated when it is detected that a sorting outlet has not accumulated any mailpieces for a predetermined period of time, and said time second data is assigned to the signatures of the mailpieces in said sorting outlet;

the time second data is generated in response to detection of the end of the first sorting pass, and said time second data is assigned to the signatures of the mailpieces in the sorting outlets; and said third and fourth data are placed on a tray label in the form of a bar code that is readable by a scanner.

The method of the invention thus makes use of the fact that a certain amount of correlation exists between the spatial locations of the mailpieces in the trays at a given instant and the spatial locations of the signatures at said given instant in the chronological succession of signatures recorded in the memory during the first sorting pass.

In practice, the operator can transfer the mailpieces from an accumulation sorting outlet to an empty tray before, while, or after retrieving a time-stamped label to be affixed to the tray.

Said mailpieces can thus be the mailpieces already present in the sorting outlet prior to the time of the label and/or the mailpieces present in the sorting outlet after the time of the label, with the limit being that the sorting outlet at the time of the label can be full or empty of mailpieces and that only one storage tray per sorting outlet can be being filled at any one time.

If "MxNbrMPT" designates the maximum mailpiece storage capacity of a tray and "MxNbrMPSO" designates the maximum mailpiece storage capacity of an accumulation sorting outlet, it is possible firstly to limit the size of the signature exploration space (in terms of number of signatures to be scanned) designated by SearchSpaceSize to a value computed on the basis of MxNbrMPT and of MxNbrMPSO.

If, in practice, the operator always retrieves a time-stamped label before loading an empty tray with mailpieces from a sorting outlet, it can be considered that if, at the time of the label, the sorting outlet is full, then the mailpieces transferred to the tray were taken from among MxNbrMPSO mailpieces in the sorting outlet, and that if, at the time of the label, the sorting outlet is empty, then the mailpieces transferred to the tray were taken from among MxNbrMPT successive mailpieces arriving in the sorting outlet. In which case, the exploration space optimized in accordance with the invention is constituted with MxNbrMPSO chronologically contiguous signatures having time second data immediately prior to the time of the label, and with MxNbrMPT chronological contiguous signatures having time second data immediately subsequent to the time of the label.

If the operator always retrieves a time-stamped label only after the empty tray has been loaded with mailpieces from a sorting outlet, it can be considered that if, at the time of the label, the sorting outlet is empty, then the mailpieces transferred to the tray were taken from among MxNbrMPT successive mailpieces arriving in the sorting outlet, and that if, at the time of the label, the sorting outlet is full, then the mailpieces transferred to the tray were taken from among MxNbrMPSO mailpieces in the sorting outlet. In which case, the exploration space that is optimized in accordance with the invention is constituted with MxNbrMPSO+MxNbrMPT chronologically contiguous signatures having time second data immediately prior to the time of the label.

If the operator retrieves the time-stamped label while the tray is being loaded, the exploration space that is optimized in accordance with the invention is constituted with MxNbrMPSO+MxNbrMPT chronologically contiguous signatures having time second data immediately prior to the time of the label and with MxNbrMPT chronologically contiguous signatures having time second data immediately subsequent to the time of the label.

It can thus be seen that optimizing the size of the signature memory space in accordance with the invention is related to the storage capacities of the sorting outlets and of the trays. If each of the trays can contain 500 C5-format letters and if each of the sorting outlets can accumulate 600 C5-format letters, it is possible to limit the size of the signature exploration space to 1100 signatures in all.

BRIEF DESCRIPTION OF THE DRAWINGS

An implementation of the method of the invention is described in more detail below and is shown by the drawings. This description is given merely by way of example, the example being given by way of indication and in no way limiting the invention. In the drawings:

FIG. 1 is a diagrammatic view of a face of a mailpiece that bears a delivery address;

FIG. 2 is a highly diagrammatic view of a postal sorting machine for implementing the method of the invention;

FIG. 3 is a flow chart showing how the method of the invention proceeds during a first sorting pass;

FIG. 4 is a flow chart showing how the method of the invention proceeds during a second sorting pass; and FIG. 5 shows, highly diagrammatically, how the signatures, the designation data designating sorting outlets, and the time data are put into correspondence with one another.

DETAILED DESCRIPTION OF THE PREFERRED EMBODIMENTS

FIGS. 3 and 4 are highly simplified flow charts showing an implementation of the method of the invention for sorting in two sorting passes on the same sorting machine such as the machine 1 equipped with accumulation-type sorting outlets.

With reference to FIG. 3, in an initial step 11 of the first sorting pass, mailpieces are loaded into the magazine of the inlet unstacker 2 of the sorting machine 1.

The mailpieces are unstacked and conveyed in series and on edge to the image acquisition device 3. The beginning of the first sorting pass can be recognized by the machine 1 on detecting a control card or "separator" that is passed before the mailpieces as is well known.

In step 12, the device 3 forms a digital image of each mailpiece bearing the address A, and the unit 5 uses OCR to extract from each image sorting data corresponding to the address A of the mailpiece in question, and uses computation to derive from the image an image signature V_id that serves as a unique identifier for the mailpiece in question.

In step 13, these signatures or "digital fingerprints" V_id associated with the successive mailpieces in the first sorting pass are recorded in a memory DB, e.g. in a database, in correspondence with the sorting data associated with the mailpieces and retrieved by OCR or by video coding. In addition, the unit 5 records in the memory DB, in correspondence with each signature V_id, designation data SO indicative of the sorting outlet number to which the mailpiece associated with the signature in question is directed. The term "sorting outlet number" is used to mean any unique sorting-outlet identifier that is recognizable by the unit 5.

During the first sorting pass, the successive mailpieces accumulate in the sorting outlets 7, and said sorting outlets must therefore be emptied as they become full.

In step 14, the operator actuates a labeling machine 8 that is associated with a sorting outlet containing mailpieces and that delivers to the operator a tray label 10. In the example, this label is affixed by the operator on a face of an empty tray 8 that is then filled in step 15 with the mailpieces taken from the sorting outlet.

In accordance with the invention, in step 14, the label 10 delivered by the labeling machine 8 is a code, e.g. a bar code, that encodes designation data SO representative of the number of the sorting outlet 7 that is unloaded into the tray receiving the label and time data Cb delivered by a clock (not shown). The time data Cb is the instant of labeling, for example. It should be understood that, during the first sorting pass, the operator can thus fill a plurality of storage trays 8 from the same sorting outlet 7 of the machine, and that the trays for that sorting outlet therefore have codes with differing time data Cb.

In accordance with the invention, in parallel with the mailpieces being stored in the sorting outlets 7 of the machine and in parallel with them being transferred in the trays 8, the unit 5 records, in the memory DB, time data as delivered by the clock in correspondence with the signatures V_id.

In the example, said time data associated with the signatures is generated in the following manner.

In step 16, the unit 5 monitors the level of accumulation of the mailpieces in all of the sorting outlets 7. If the unit 5 detects that, in a sorting outlet in question, the number N of accumulated mailpieces has crossed a certain threshold value, then, in step 17, it constitutes a file in the memory DB, in which file it groups together all of the signatures generated for the last N mailpieces present in said sorting outlet until the moment of said detection. The name of said file encodes the designation data SO corresponding to the sorting outlet in question and time data TT that can be the instant at which the file is created, for example, or indeed the instant at which said crossing of the threshold is detected. In this implementation, particular time data TT is thus put into correspondence with a plurality of signatures grouped together into a file. Said file can be seen as a kind of "virtual tray" for the signatures.

The value N of the counting threshold is an adjustable parameter of the system but it is preferably chosen to be less than the maximum mailpiece storage capacity of a sorting outlet and to be less than the maximum mailpiece storage capacity of a tray. It can be observed that a value N equal to 150 is well suited for a configuration having a tray storage capacity of 500 mailpieces and a sorting outlet storage capacity of 600 mailpieces.

While a sorting outlet is being filled completely, it is thus possible for the threshold value to be crossed a plurality of times in succession, and thus it is possible to have as many distinct signature files associated with the outlet in question.

In order to avoid blocking the process of creating signature files, the unit 5 is arranged also to monitor the mailpiece accumulation activity in each sorting outlet. If it detects that, in a sorting outlet, there has not been any mailpiece accumulation for a predetermined period of time T, it then constructs a new file associated with said sorting outlet and grouping together the signatures of a certain number of mailpieces present in said sorting outlet at the time of this detection. This file also has a name that encodes time data TT that can be the instant of creation of the file, for example, or indeed the data/instant of detection of the lack of accumulation activity in the sorting outlet, as indicated above. The unit 5 can also detect the instant at which the first sorting pass ends, and can create, for each sorting outlet, a last file that groups together the signatures of a certain number of mailpieces present in the sorting outlet in question at the time at which the sorting pass ends at step 18.

It should be understood that these files have contents that is disjoint and that, in each file, the signatures are recorded in chronological order. Said files therefore segment all of the signatures into blocks that are disjoint, each block comprising 150 or fewer signatures.

FIG. 5 shows an example of segmentation into files of all of the signatures V_id in the memory DB in accordance with the invention.

FIG. 5 shows the signatures V_id1, . . . , V_idp ordered from top to bottom chronologically as they are generated by the unit 5.

In order to simplify the description, all of these signatures correspond to mailpieces accumulated in the same sorting outlet SO1.

Each of the files 30 groups together a subset of said signatures V_id of mailpieces directed towards the sorting outlet SO1. For each file 30, particular time data TT has been generated by the unit 5 in the name of the file. The name of the file is symbolized by a header formed of the data pair (SO-TT). For example, the file 30 with the header SO1-TT1 contains a first group of signatures associated with mailpieces accumulated in the sorting outlet SO1 until crossing of the counting threshold N is detected for the first time by the unit 5. For example, the file 30 with the header SO1-TTi contains a second group of signatures associated with mailpieces accumulated in the sorting outlet SO1 until crossing of the inactivity threshold T is detected for the first time by the unit 5. For example, the file 30 with the header SO1-TTn contains a third group of signatures associated with mailpieces accumulated in the sorting outlet SO1 until ending of the first sorting pass is detected by the unit 5. It should thus be considered that the files 30 are shown one below the other in order to show a chronological order of the information TT that is identical to the chronological order of the signatures V_id. In particular, TT1 is a instant that is earlier than TTn. For the various sorting outlets, the unit 5 thus generates a plurality of files 30 that can thus be put in chronological order. It should be understood that the times TT, Cb recorded firstly in association with the signatures and secondly on the tray labels should be delivered by the same clock or by synchronized clocks.

At the end of the first sorting pass, all of the storage trays 8 filled with mailpieces are brought to the inlet unstacker 2 of the machine 1 so as to submit the mailpieces to a second sorting pass.

The second sorting pass starts in FIG. 4 at step 20 with the label 10 of a first storage tray 8 being read by scanner so as to retrieve the data TT and Cb coded in the label of the tray.

In step 21, the mailpieces contained in the first storage tray are placed in the magazine of the unstacker 2 so as to be unstacked and conveyed in series and on edge to the image acquisition device 3. The unit 5 derives a current signature V_id from the image of each current mailpiece in step 22.

In parallel with steps 21 and 22, in step 23, the unit 5 scans, in the memory DB, the names of files 30 constructed in the first sorting pass, so as to identify the file that contains designation data SO that is identical to the designation data SO retrieved in step 20 from the label of the current tray, and time data TT that is closest to the time data Cb derived from the label of the tray.

FIG. 5 shows a time data Cb associated with the label of the current storage tray in register with the file 30 having the header SO1-TTi associated with the sorting outlet SO1, while considering that TTi is the time subsequent to the time Cb that is closest to the time Cb when compared with the other times TT1, . . . , TTn.

In accordance with the invention, the first signature V_idi in the file 30 in FIG. 5 identified in step 23 determines a reference on the basis of which the unit 5 loads the exploration memory space for signature exploration.

More particularly, in the example in which the operator retrieves a tray label before filling the tray with mailpieces, said exploration memory space is loaded with the 600 signatures (maximum storage capacity of a sorting outlet) associated with the sorting outlet SO1 that chronologically precede the reference signature V_idi as indicated by arrow 31 in FIG. 5, and with the 500 signatures (maximum storage capacity of a temporary storage tray) associated with the sorting outlet that chronologically follow the reference signature V_idi as indicated by arrow 32 in FIG. 5.

If the time data TT is common to a block of signatures, the size of the exploration memory space is extended to, at the maximum, 1400 signatures by adding the equivalent of the maximum size of a file 30 (150 signatures) on either side of the reference signature V_idi.

In addition, the size of the exploration space can be further increased to a small extent in such a manner as to take account of specific situations while the storage trays are being unloaded into the inlet unstacker 2 of the machine. For example, it is known that it can happen that an operator might interpose mailpieces taken from one storage tray into the middle of a stack of mailpieces in the magazine of the unstacker 2. Machine jam situations can have the same effects, i.e. they can break the chronological order of the mailpieces at the inlet of the sorting machine for the second sorting pass.

Such situations are taken into account by over-dimensioning the exploration memory space. For example, in a conventional sorting machine 1, the number of mailpieces conveyed between the tray label scanner and the acquisition device 3 corresponds to about five storage trays. In which case, the exploration space is extended by multiplying its size by five. For example, in the example, the exploration space includes 1400×5=7000 signatures. Tests have shown that this size of exploration space is sufficient to obtain optimum operation of mailpiece identification by image signatures, including when the chronological order of the mailpieces is disordered considerably between the two sorting passes.

In step 25 in FIG. 4, the unit 5 scans the signatures in the exploration memory space so as to detect a match with a current mailpiece signature generated in step 22. The steps 21, 22, and 25 are repeated with the same content of exploration memory space until a new tray is presented at the inlet of the machine in step 26. Whereupon, the unit 5 loads new signatures into the exploration memory space by running the steps 20, 23, and 24, while taking account of the new time data Cb associated with said new tray.

In order to maintain a limited number of signatures in the exploration memory space, the unit 5 can systematically delete the signatures as described in Patent Document PCT/FR2004/050764.

After detecting a match between the current fingerprint and a fingerprint from the exploration space in step 25, the unit 5 retrieves sorting data from the information base in the memory DB for the purpose of directing the current mailpiece towards a sorting outlet. The process repeats itself for successive mailpieces and successive storage trays until the end of the sorting of the mailpieces in the second pass.

The method of the invention can be applied for sorting in a plurality of sorting passes on a plurality of sorting machines on a plurality of sorting sites. In which case, it is necessary, in the tray labels, to encode designation data SO that also identifies the sorting machine and the sorting site. Similarly, it is also necessary for the designation data SO that is assigned to the signatures in the first sorting pass also to identify the sorting machine and the sorting site.

The invention claimed is:

1. A method of sorting mailpieces in at least two sorting passes in a sorting machine with sorting outlets into which the mailpieces are directed from an unstacking inlet, wherein, in the first sorting pass, images are formed of the surfaces of the mailpieces so as to derive first image signatures serving as unique identifiers for the mailpieces in the machine, wherein, in the second sorting pass for sorting the mailpieces, an image of the surface of a current mailpiece is formed again so as to derive a current image signature associated with the current mailpiece, and first image signatures are grouped together in a set in a signatures exploration memory space and are scanned in order to detect a match with said current signature, and wherein the mailpieces are transferred manually using storage trays from the sorting outlets to the unstacking inlet between the two sorting passes, said method comprising the following steps:

during the first sorting pass: recording first data in a machine memory in correspondence with each first signature associated with a mailpiece, said first data being designation data indicative of the sorting outlet number to which the mailpiece is directed; recording second data in the machine memory in correspondence with the first signature associated with said mailpiece, the second data being time data as delivered by a clock; and affixing a label on each storage tray in which the mailpieces taken from a sorting outlet are transferred, further comprising the steps of label coding third data and fourth data, said third data being designation data indicative of said sorting outlet number and said fourth data being time data delivered by said clock; and during the second sorting pass, when a current storage tray filled with mailpieces is presented at the unstacking inlet: retrieving said third and fourth data from the label affixed on the current tray; identifying a reference signature from among said first signatures recorded in the signatures exploration memory space, said reference signature having first and second data that correspond respectively to said third and fourth data retrieved from the label on the current tray; and loading into the signatures exploration memory space first signatures that are chronologically contiguous with said reference signature and having the same designation first data, the number of chronologically contiguous first signatures in the signatures exploration memory space being determined on the basis of the maximum mailpiece storage capacities of a tray and of a sorting outlet.

2. A method according to claim 1, wherein the number of mailpieces directed to each sorting outlet in the first sorting pass is counted, and wherein the second data is generated when it is detected that a sorting outlet has accumulated a predetermined number of mailpieces, and wherein said second data is assigned to the signatures of those mailpieces.

3. A method according to claim 2, wherein the accumulation activity of each sorting outlet in the first sorting pass is monitored, and wherein the second data is generated when it is detected that a sorting outlet has not accumulated any mailpieces for a predetermined period of time, and wherein said second data is assigned to the signatures of the mailpieces in said sorting outlet.

4. A method according to claim 2, wherein the second data is generated in response to detection of the end of the first sorting pass, and said second data is assigned to the signatures of the mailpieces in the sorting outlets.

5. A method according to claim 1, wherein said third and fourth data are placed on a tray label in the form of a bar code that is readable by a scanner.

* * * * *